UNITED STATES PATENT OFFICE.

JOHN W. DODGE, OF NEW YORK, N. Y.

IMPROVED PREPARATION FOR DESTROYING VERMIN.

Specification forming part of Letters Patent No. 41,687, dated February 23, 1864; antedated February 21, 1864.

*To all whom it may concern:*

Be it known that I, JOHN W. DODGE, of the city, county, and State of New York, have invented a new and Improved Vermin-Exterminator; and I do hereby declare that the following is a full, clear, and exact description of the same.

The object of this invention is a composition which will in every case kill all kinds of vermin that infest the human head or body, and also cattle, which is equally effective on bed-bugs and fleas.

The composition is made of alcohol, distilled or rain water, and *Cocculus Indicus*, which are mixed together in about the following proportion: Alcohol, (ninety-five per cent.,) one gallon; distilled or rain water, two gallons; *Cocculus Indicus*, one and one-half pound. The *Cocculus* is ground into powder and extracted by percolation. When the extract is finished it may be flavored with oil of verbena, or with any other suitable perfume.

By the use of alcohol diluted in the proportion above specified I am enabled to extract completely all the efficient and destructive properties of the berry, and by adhering to the above-named proportion between the liquids and the berry an extract is produced which is exceedingly mild and perfectly innocent as an external application; and, furthermore, it will keep unchanged for any length of time in any climate.

I am aware that an extract of *Cocculus Indicus* has been used for destroying vermin; but such extract cannot be applied without danger to the human head or body, whereas my composition can be applied externally to any part of the human body for the purpose of destroying lice, fleas, and other vermin, and it can be used with equal advantage upon horses, mules, cattle, fowls, and other animals. When used against lice it will not only destroy the live animals, but the nits. It can also be used with equally destructive effect against bed-bugs. In short, my composition is the most effective and infallible vermin-exterminator which has ever been offered to the public.

What I claim as new, and desire to secure by Letters Patent, is—

The within-described composition, mixed together, of the ingredients herein specified, substantially in the manner and about in the proportion set forth.

JOHN W. DODGE.

Witnesses:
    THOS. L. J. DOUGLAS,
    GEO. W. REED.